United States Patent [19]
Pellegrini et al.

[11] Patent Number: 5,443,355
[45] Date of Patent: * Aug. 22, 1995

[54] TRASH COLLECTION VEHICLE

[76] Inventors: Louis A. Pellegrini, 1231 Thurston Ave., Los Altos, Calif. 94022; Tom T. Matsumoto, 889 Spinosa Dr., Sunnyvale, Calif. 94087

[*] Notice: The portion of the term of this patent subsequent to Dec. 24, 2008 has been disclaimed.

[21] Appl. No.: 164,669

[22] Filed: Dec. 7, 1993

Related U.S. Application Data

[63] Continuation of Ser. No. 813,328, Dec. 24, 1991, abandoned, which is a continuation of Ser. No. 569,262, Aug. 17, 1990, Pat. No. 5,074,737, which is a continuation of Ser. No. 465,559, Jan. 16, 1990, abandoned, which is a continuation of Ser. No. 179,019, Apr. 8, 1988, abandoned.

[51] Int. Cl.⁶ .................... B65F 3/04; B65D 88/12
[52] U.S. Cl. .................................... 414/786
[58] Field of Search ................ 414/406–409, 414/509–517, 492, 493, 785, 786, 425, 414, 419–421, 525.4; 296/183, 184, 56, 146, 24.1; 232/43.3; 298/8 R, 8 H, 24, 23 MD; 220/908, 500

[56] References Cited

U.S. PATENT DOCUMENTS

| | | | |
|---|---|---|---|
| 738,863 | 9/1903 | White | 296/56 |
| 2,606,675 | 8/1952 | Jones | 414/424 X |
| 2,914,205 | 11/1959 | Trubinski | 414/525.4 X |
| 3,024,932 | 3/1962 | Dodger | 414/489 |
| 4,113,125 | 9/1978 | Schiller | 414/406 |
| 4,557,658 | 12/1985 | Lutz | 414/512 X |
| 4,648,775 | 3/1987 | Verner | 414/408 X |
| 5,074,737 | 12/1991 | Pellegrini et al. | 414/406 |

FOREIGN PATENT DOCUMENTS

| | | | |
|---|---|---|---|
| 3537546 | 4/1987 | Germany | 414/512 |
| 2939 | 2/1914 | United Kingdom | 298/8 R |

*Primary Examiner*—David A. Bucci
*Attorney, Agent, or Firm*—Townsend and Townsend Khourie and Crew

[57] ABSTRACT

A vehicle having a bed which is pivotal from a trash collection position to a trash dumping position. The bed is provided with inner walls for dividing the interior of the bed into three compartments, a central compartment for receiving paper and two side compartments for receiving, respectively, metal materials and glass materials. The central compartment has a push blade which forces paper materials rearwardly toward a rear access door. The blade carries two skimmer plates in respective side compartments for skimming the top piles of waste materials in the two side compartments. The bed is provided with rear side openings covered by doors which, when opened, allow materials to move out of the side compartments when the bed it tilted.

1 Claim, 3 Drawing Sheets

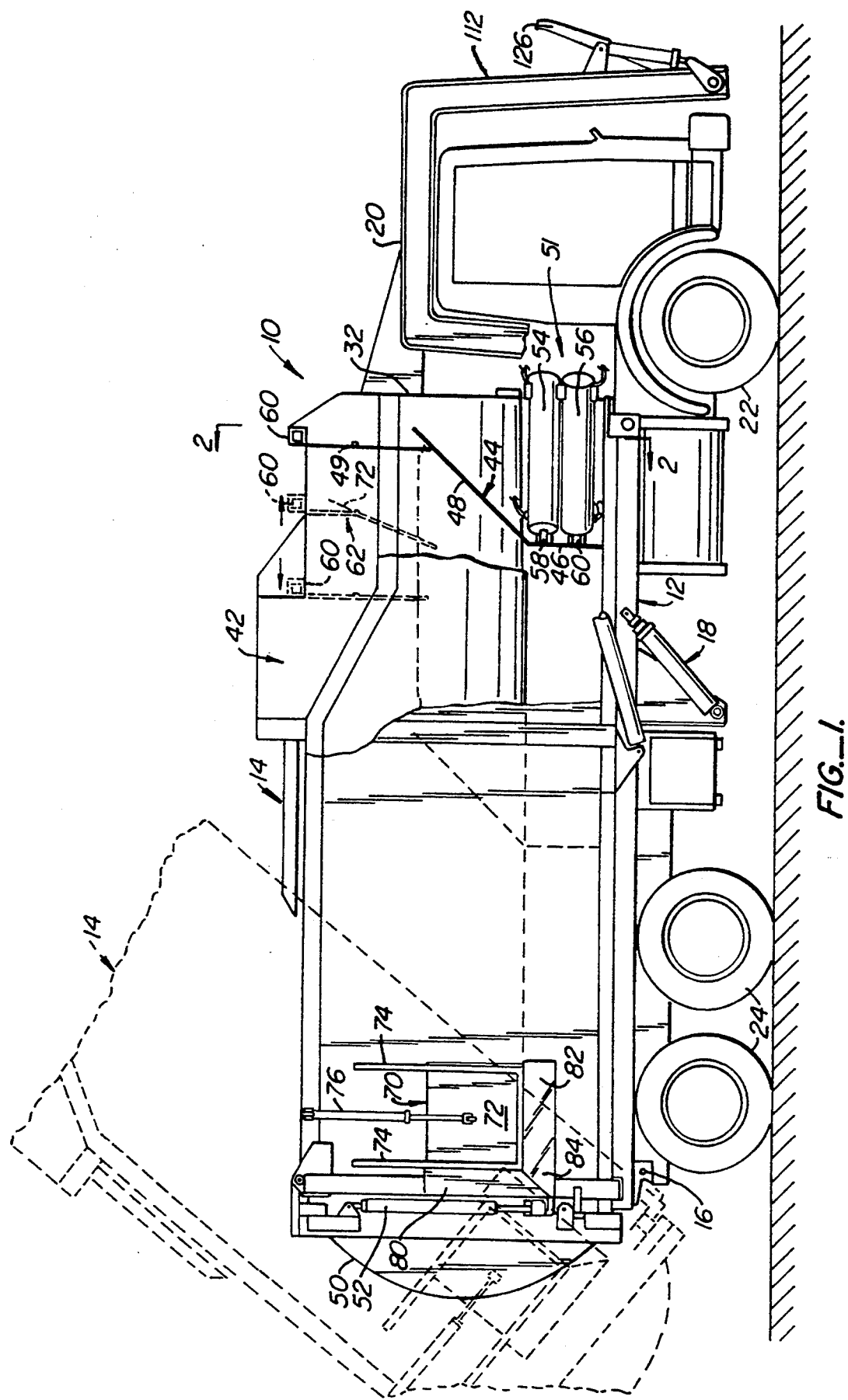
FIG._1.

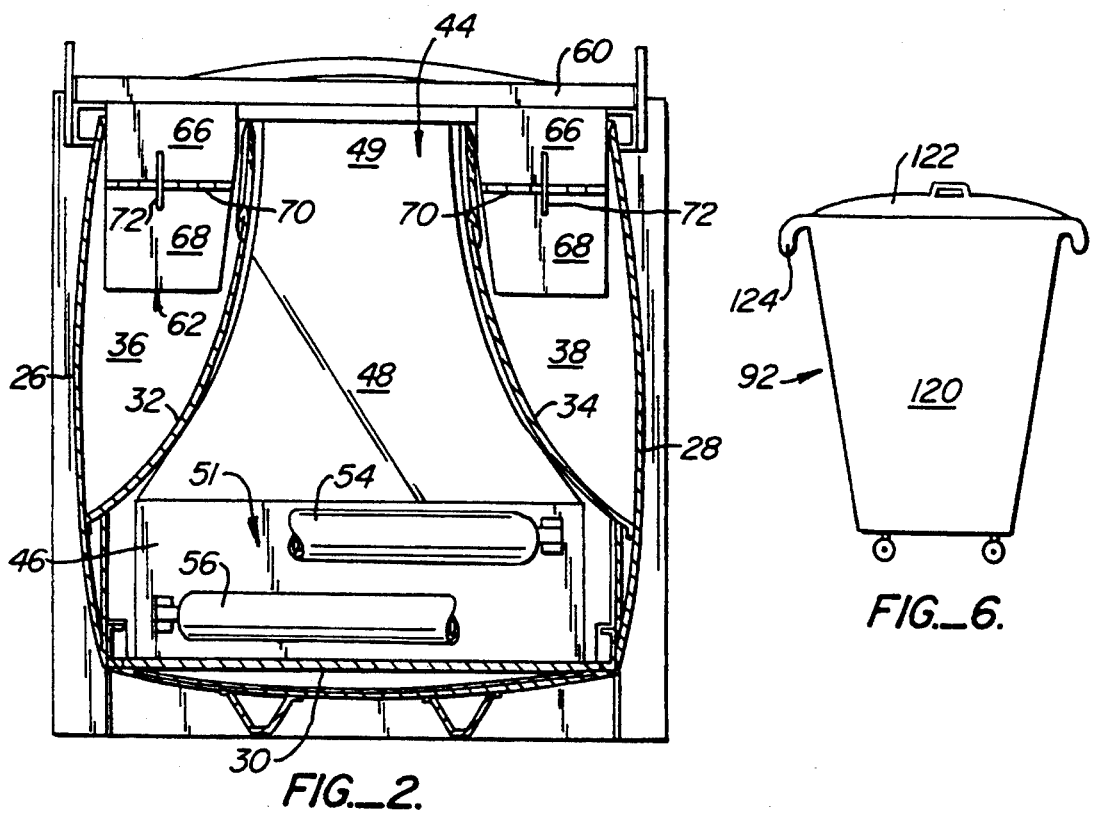
FIG._2.
FIG._6.
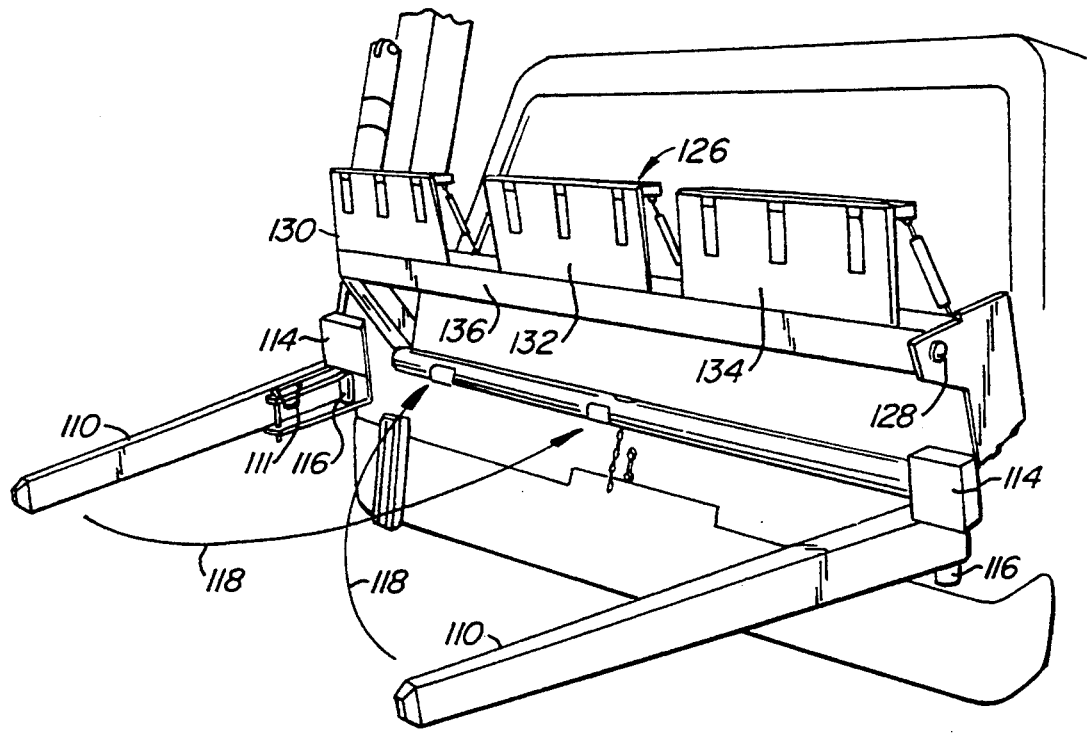
FIG._3.

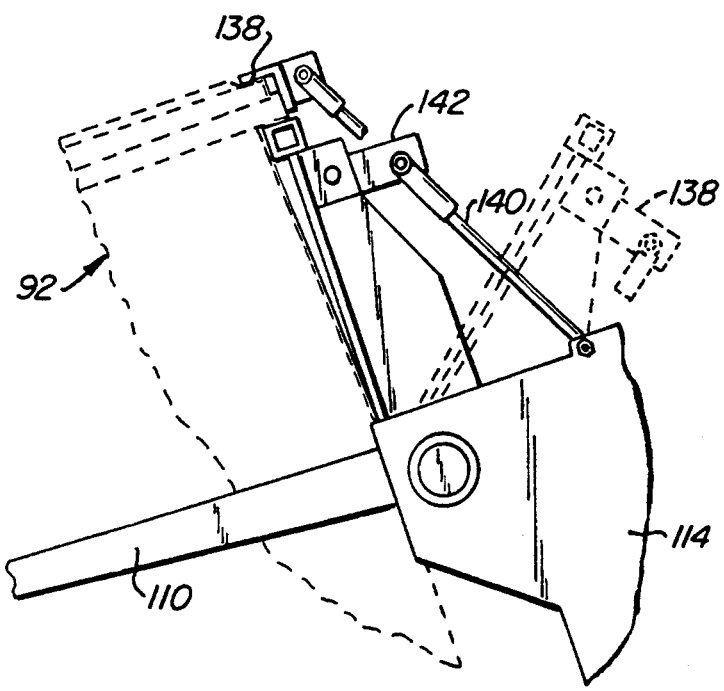
FIG._4.
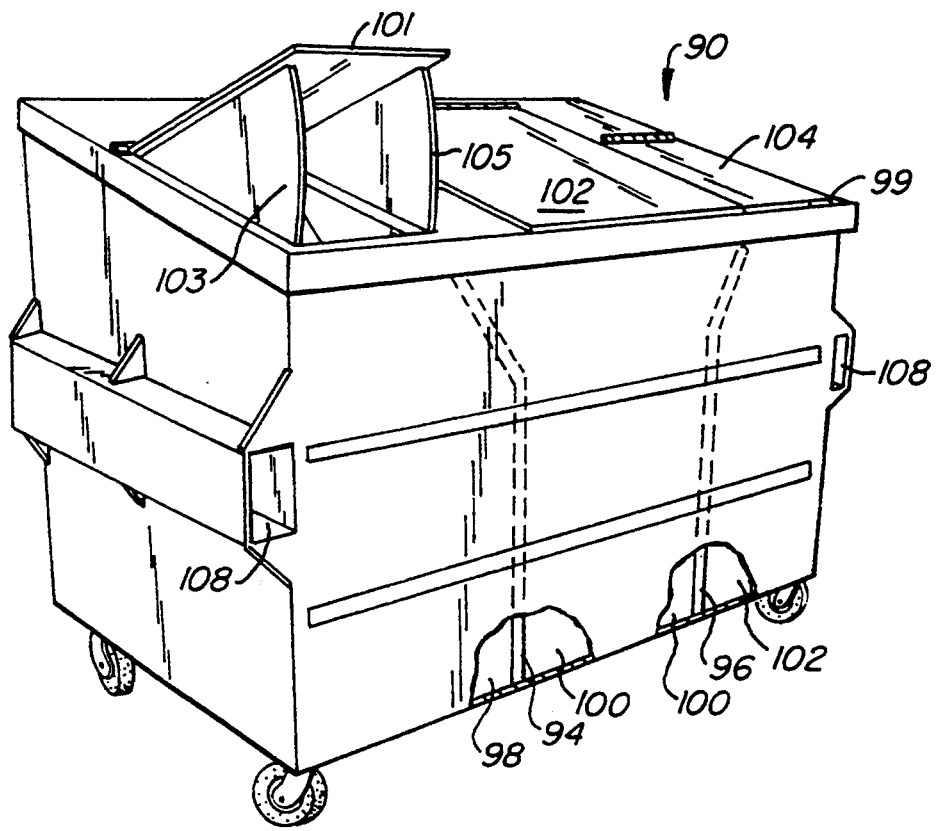
FIG._5.

TRASH COLLECTION VEHICLE

This is a Continuation of application Ser. No. 07/813,328, filed Dec. 24, 1991, now abandoned; which was a Rule 60 Contnuation of Ser. No. 07/569,262, filed Aug. 17, 1990, now U.S. Pat. No. 5,074,737, which was a continuation of Ser. No. 07/465,559, filed Jan 16, 1990, now abandoned; which was a continuation of Ser. No. 07/179,019, filed Apr. 8, 1988, now abandoned.

BACKGROUND OF THE INVENTION

1. Field of the Invention

This invention relates to improvements in the collection of trash and, more particularly, to an improved vehicle having a compartmented bed for collecting trash in segregated spaces.

2. Description of the Prior Art

It is well known to collect segregated waste materials, such as metal cans, newspapers and glass jars and bottles in compartmentalized containers and then to lift the containers up to inverted positions in which the contents of the containers can be dumped into vehicles having walls defining separate compartments. One inventive concept relating to this field is disclosed in U.S. patent application Ser. No. 563,748, filed Aug. 3, 1990 now U.S. Pat. No. 5,116,184, which is a continuation of U.S. patent application Ser. No. 423,829, filed Oct. 19, 1989, now abandoned, which is a continuation of U.S. patent application Ser. No. 277,474, filed Nov. 23, 1988, now abandoned, which is a continuation of U.S. patent application Serial No. 053,205, filed May 21, 1987, now abandoned. In such disclosure, the vehicle is provided with a bed, a pair of outer side walls and inner wall means for defining a number of side-by-side compartments extending longitudinally of the vehicle. Each compartment is adapted for receiving a specific recyclable material, such as metal, paper or glass. Each compartment has a blade extending the entire height of the compartment, and the blades are movable through the respective compartments for compressing the materials in the compartments and for forcing the materials out of the compartments through a discharge opening at the rear of the vehicle.

The vehicle has a top opening to allow segregated, recyclable materials to be directed into the bed of the vehicle when a compartmented container is lifted and pivoted into an inverted position so that the container dumps its contents into the bed of the truck into the respective compartments thereof.

Other disclosures relating to this general subject matter are found in U.S. Pat. Nos. 4,424,953, 2,258,988, 2,606,675, 3,300,128, 3,643,993, 4,113,125, 4,328,988, 4,373,849, 4,453,879, 4,632,628 and 4,676,431, and German Patents 3,420,058 and 3,537,546.

While the disclosures of the prior art provides structures which are satisfactory in certain applications, it has been found that improvements in trash collection vehicles still are needed to accommodate the increased demand for trash collection capability as well as to minimize labor costs and costs of trash collection equipment. The present invention satisfies this need.

SUMMARY OF THE INVENTION

The present invention includes a vehicle having a bed which is pivotal from a trash collection position to a trash dumping position. The bed of the vehicle is provided with inner wall means for dividing the interior of the bed into three compartments, a central compartment for receiving paper and two side compartments for receiving, respectively, metal materials and glass materials. The central compartment has a pusher blade or ram which forces paper materials rearwardly toward a rear access door. The blade carries with it two skimmer plates in respective side compartments for skimming the top piles of waste materials in the two side compartments, whereby the skimming action of the two side plates keeps the waste materials in the side compartments evenly distributed therein. The bed of the truck is provided with rear side openings covered by doors which, when opened, allow materials to move out of the side compartments when the bed is tilted. Generally, the rear access door closing the rear end of the central compartment is opened when the side openings are opened so that dumping of the trash contents of the three compartments occurs simultaneously or individually. Controls are provided selectively tilting the bed of the truck as well as for operating the ram in the central compartment.

Another feature of the present invention is the provision of a pair of pivotal blades for placement in the side blade guides of a container which is also compartmentalized and is adapted to be lifted up by the blades into a dumping position above the top opening of the bed of the vehicle. Thus, waste materials, such as metals, glass and paper, when held segregated in the container can be dumped into the bed of the vehicle into respective compartments. The blades are pivotally mounted on the container lifting structure of the vehicle so that the blades can be moved into retracted positions extending transversely of the path of travel of the vehicle from forwardly extending positions in which the blades can move into the blade-receiving side guides in a compartmentalized container. The pivotal action of blades allows the vehicle to be used as well with individual carts of the type having a lid covering an opening of the cart, the cart being provided with a top flange around the opening. Clamps are provided on the lifting structure of the vehicle so that three individual carts can be clamped at their top flanges or at other structure on the carts and then lifted and dumped simultaneously of their contents into respective compartments of the bed of the vehicle. Thus, the vehicle is suitable for collecting trash either from a compartmentalized single container or a number of individual carts or source-separated material placed at curbside by residents. The carts can be separately clamped onto the lifting mechanism of the vehicle.

The primary object of the present invention is to provide an improved trash collection vehicle having a compartmentalized, pivotal bed which receives segregated trash materials in a manner such that the materials are kept segregated in the bed as well as uniformly distributed therein, wherein the bed can be readily pivoted to empty the contents of the compartments out of the bed through rear openings provided therefor, yet the bed can provide a space having a relatively large volume for trash collection.

Another object of the present invention is to provide an improved trash collection vehicle of the type described wherein the vehicle can accommodate relatively large, compartmented containers, as well as individual carts for receiving and holding segregated trash materials so that the vehicle is not limited to a single type of trash collection container.

Another object of the present invention is to provide a vehicle of the type described wherein the vehicle is simple and rugged in construction, has relatively few moving parts and can be made at minimum cost.

Other objects of this invention will become apparent as the following specification progresses, reference being had to the accompanying drawings for an illustration of the invention.

BRIEF DESCRIPTION OF THE DRAWINGS

FIG. 1 is a schematic side elevational view of a trash collection vehicle of the present invention, parts being broken away to illustrate details of construction;

FIG. 2 is a cross-sectional view taken along line 2—2 of FIG. 1;

FIG. 3 is a fragmentary, perspective view of the front of the vehicle, showing the pivotable blades for coupling the vehicle to a compartmented trash container;

FIG. 4 is a side elevational view of the blade assembly of FIG. 3;

FIG. 5 is a perspective view of a compartmented container for receiving trash and which is to be used with the vehicle of FIG. 1; and FIG. 6 is a side elevational view of a trash cart for use with the vehicle of FIG. 1.

DETAILED DESCRIPTION OF THE PREFERRED EMBODIMENTS

The trash collection vehicle of the present invention is broadly denoted by the numeral 10 and is shown in FIG. 1. Vehicle 10 includes a frame 12 on which a bed 14 is pivotally mounted by means of a pin 16 at the rear end of the frame. Bed 14 is collectably tilted upwardly and rearwardly to dump the contents of the bed into a collection region at the rear of the vehicle. Bed 14 is shown in full lines in FIG. 1 to show the position of the bed when it is used to collect trash. Bed 14 is shown in dashed lines in FIG. 1 in a tilted position in which the trash in the bed can be dumped rearwardly of the vehicle. Means for tilting the bed can comprise a fluid piston cylinder assembly 18 (FIG. 1) as is well known.

Vehicle 10 further includes a cab 20 at the front of the vehicle and ground engaging front and rear wheels 22 and 24, respectively. A motor (not shown) is used to move the vehicle forwardly and rearwardly as well as to provide the power for operating various control devices, such as fluid piston cylinder assemblies which control the movements of several of the shiftable parts of the vehicle.

Bed 14 includes a pair of side walls 26 and 28 as shown in FIG. 2. The side walls extend throughout the length of the bed and are coupled to a bottom wall 30 coupled to the frame 12 of the vehicle. The front wall 32 is provided for the front end of bed 14.

Within bed 14 are a pair of curved inner side walls 32 and 34 (FIG. 2) which define a pair of side compartments 36 and 38, respectively, with side walls 26 and 28 of the bed. A center compartment 40 is formed between and below inner sides 32 and 34; thus, by virtue of sides 32 and 34, the inner space of the bed is divided in three compartments with the center compartment 40 being relatively large and the two side compartments 36 and 38 being relatively small.

Compartment 40 is adapted to receive paper, compartment 38 is adapted to receive metal cans and other metal materials, and compartment 36 is adapted to receive glass, such as bottles, jars and the like. Sides 32 and 34 extend throughout the length of the bed and are secured at their lower margins to the inner surfaces of respective side walls 26 and 28. Sides 32 and 34 are curved to cause gravitation of the metal and glass toward the inner surfaces of respective side walls 26 and 28 to render it easier to dump the metal and glass from bed 14 when bed 14 is tilted into the dashed line position of FIG. 1.

Bed 14 has a top opening or several top openings to permit trash to be dumped into the three compartments 36, 38 and 40. For purposes of illustration, only a single opening 42 is shown in FIG. 1 but it is clear that three such openings could be used for respective compartments 36, 38 and 40.

Bed 14 is provided with a pusher blade or ram 44 in compartment 40 as shown in FIGS. 1 and 2. Pusher blade 44 includes a lower, vertical part 46 (FIG. 1), an inclined intermediate part 48, and an upper vertical part 49 which extends upwardly to opening 42. Means 51 is provided to move blade 44 rearwardly and forwardly, rearward movement being sufficient to force the contents of compartment 40 to the rear toward an exit door 50 which can be opened by the actuation of a fluid piston cylinder assembly 52 (FIG. 1) when it is desired to dump the contents of bed 14. Such moving means 51 includes a pair of fluid piston and cylinder assemblies 54 and 56 having piston rods 58 and 60 secured to the front surface of lower part 46 of blade 44. The opposite ends of the assemblies 54 and 56 are coupled in some suitable manner to bed 14 at the front wall 32 thereof so that, upon actuation of the assemblies 54 and 56, blade 44 will be forced rearwardly and thereafter can be reversed and moved forwardly into its starting position shown in FIG. 1. The blade 44 can thus move from the full line position of FIG. 1 to the dashed line position and return. The movement of the blade can take place when the bed is horizontal as shown in FIG. 1 or when the bed is inclined as shown in dashed lines in FIG. 1.

The upper margin of part 49 of blade 44 is coupled to a cross bar 60 (FIGS. 1 and 2), and bar 60 moves rearwardly when blade 44 moves to the rear under the influence of the operation of assemblies 54 and 56. Bar 60 can move as far rearwardly the rearmost dashed line position shown in FIG. 1.

A pair of skimmer plates 62 and 64 are secured to and depend from bar 60 as shown in FIGS. 1 and 2. Each of skimmer plates 62 and 64 includes an upper plate portion 66 and a lower plate portion 68, portions 66 and 68 being hingedly connected by hinge 70 for pivotal movement about a generally horizontal axis. A shear pin 72 is provided on lower portion 68 to allow pivotal movement in a clockwise sense when viewing FIG. 1 but allowing no pivotal movement in a counterclockwise sense when viewing FIG. 1.

As bar 60 moves rearwardly with blade 44, lower portions 68 of skimmer plates 62 and 64 extend into respective side compartments of bed 14 and skim the top of the contents in the respective compartments 36 and 38 to even out the distribution of the contents in the respective compartments. Thus, the contents will not necessarily accumulate in a local position, namely the position directly below opening 42. If the contents are such that continued rearward movement of the skimmer plates would damage the skimmer plates, shear pins 72 will shear to allow pivotal movements of lower portions 68 in a counterclockwise sense when viewing FIG. 1. Thus, the shear pins provide a safety feature for preventing damage to the skimmer plate.

The side walls 26 and 28 of bed 14 each has a rear exit door 70 for the respective compartment 36 or 38. Door 70 is shown in FIG. 1 and includes a plate 72 slidable up and down by means of tracks 74 secured to the outer surface of the respective side wall 26 or 28 of bed 14. Fluid piston cylinder assembly 76 coupled at its upper end to bed 14 is secured at its lower end to the plate 72 so that, upon actuation of assembly 76, the door 70 is raised to open the respective, adjacent compartment. Thus, when bed 14 is tilted into the dashed line position of FIG. 1, the contents of compartments 36 and 38 can be dumped by relying upon the force of gravity to direct the contents rearwardly of the bed and laterally through opening 70 into a collection region adjacent to the vehicle.

To facilitate the dumping, a pair of side plates 80 and 82 are provided for each door 70 to funnel the contents of the respective compartment as the contents move out of opening 70. Plates 80 and 82 are hingedly mounted at their forward and upper edges, respectively, so that they can be pivoted from stored positions partially overlying the outer side faces of the adjacent plate 72 to an operative position shown in FIG. 1 wherein the plates form a V-shaped channel 84 at the zone where the plates 80 and 82 abut each other.

Vehicle 10 is adapted to use two types of trash holders, one holder type being shown as a compartmented container in FIG. 5 and denoted by the numeral 90 and the other holder type being shown as a cart denoted by the numeral 92 as shown in FIG. 6. Container 90 has a side wall and an interior space divided into three compartments by two inner walls 94 and 96, the compartments being denoted by numerals 98, 100 and 102 (FIG. 5).

Container 90 is covered by a swingable top 99 having three access doors 101, 102 and 104 hingedly coupled to top 99. Each access door 101 has a pair of parallel side plates 103 and 105 which serve to direct waste materials into the respective compartments when the corresponding door 101, 102 or 104 is lifted.

Container 90 has guides 108 at the sides thereof for receiving blades 110 which are carried at the front end of a movable container lifting frame 112 (FIG. 1) which is lifted by some suitable power means (not shown) to elevate container 90 into an inverted position in which its segregated contents can be dumped into opening 42 and into bed 14.

To this end, frame 112 has a pair of posts 114 on which the rear ends of blades 110 are pivotally mounted by means of pivot pins 116. The blades can be moved from an operative, forwardly projecting positions shown in FIG. 3 to retracted positions extending horizontally and in partially overlapping relationship to each other. The direction of rotation of blades 110 is denoted by the arrows 118 (FIG. 3).

The purpose of making blades 110 pivotal is to allow them to move out of the way of the space forwardly of the blades in their retracted positions so that vehicle 10 can carry a wheeled cart 92 (FIG. 6) of the type having a body 120, an open top covered by a pivoted lid 122 and provided with a flange 124 surrounding the top of the container. Clamp structure 126 (FIG. 3) on the upper end of posts 114 is pivotally mounted by means of a pin 128 so that three such carts 92 can be coupled to the clamps 130, 132 and 134. FIG. 4 shows the clamps 130, 132 and 134 on the forward end of a bar 136 and the upper clamping portion 138 of each clamp 130, 132 and 134 is controlled by the movement of the rod 140 pivotally mounted at lower end on posts 114 and at the upper end to an ear 142 secured to the respective clamp.

The three clamps 130, 132 and 134 can pivot from the full line position shown in FIG. 4 to the dashed line position when blades 110 extend forwardly as shown in FIGS. 3 and 4.

In operation, vehicle 10 is moved from location to location at which containers 90 or carts 92 are provided. If, at a first location, a container 90 is provided, blades 110 are pivoted into forwardly extending positions as shown in FIGS. 3 and 4 and locked in position by lock means 111. Then the blades are inserted through sides 108 of container 90, then the container is lifted and inverted, and its segregated contents are dumped into the three compartments 36, 38 and 40 of bed 14. The vehicle then moves to the next location where a container or cart is located.

Clamps 130, 132 and 134 can accommodate three such carts 92, the carts being lifted manually onto the clamps and rod 140 is moved so as to clamp the cart flanges 134 to the clamps. Then the carts are lifted and their contents are dumped into respective compartments of bed 14, since tops 122 of carts 92 open automatically when the carts are properly inverted into positions overlying opening 42.

To accommodate carts 92, blades 110 are moved into the retracted or horizontal, criss-cross positions in which the blades do not project forwardly from the vehicle as shown in FIGS. 3 and 4. In such positions, clamps 130, 132 and 134 are pivoted from the dashed line positions shown in FIG. 4 to the full line positions thereof so that the clamps can clamp onto the flanges 134 of carts 92.

From time to time, it may be necessary to even out waste materials in the compartments 36, 38 and 40. To this end, assemblies 54 and 56 (FIG. 1) are energize to force blade 44 rearwardly. This causes the contents of compartment 40 to be moved rearwardly toward rear door 50. Such action also moves bar 60 rearwardly to move skimmer plates 62 and 64 rearwardly to skim off the top of the piles of the waste materials in compartments 36 and 38. This causes the upper portions of the waste materials in these two compartments to be moved rearwardly to more uniformly distribute the waste materials in the side compartments. If either of compartments 36 and 38 contain an immovable object, shear pin 72 of the corresponding skimming plate will be sheared off before the skimming plate is damaged. Shearing of the pin allows the lower part of the skimming plate to pivot in a counterclockwise sense when viewing FIG. 1.

When it is desired to dump the contents of the three compartments of bed 14, bed 14 is tilted to the dashed line position of FIG. 1, then rear door 50 and side doors 70 are opened by energizing assemblies 52 and 76. In the case of door 70, plates 80 and 82 are first pivoted into the operative positions shown in FIG. 1, so that the plates 80 and 82 of each door 70 form a V-shaped channel 84 for directing contents of the adjacent compartment to the side of the vehicle near the rear end thereof. When the contents have been completely removed from the compartments, the bed 14 is moved forwardly into its horizontal position shown in full lines in FIG. 1. Periodically, bed 14 can be moved into its tilted position (dashed line position of FIG. 1) when it is desired to move the contents of compartments 36, 38 and 40 rearwardly. This action will avoid having to move blade 44 rearwardly until it is deemed necessary to compact the contents of compartment 40.

We claim:

1. A method for collecting waste materials comprising:

providing a waste-receiving container having a bottom, a front end, and a rear end;

pivotally mounting the container about a horizontal axis near one end thereof and adjacent to the bottom;

said container having a central compartment and a pair of side compartments extending longitudinally of the container, there being a rear side opening for each side compartment, respectively;

providing a top front opening on the container near the opposite end of the container;

directing segregated waste materials simultaneously into the compartments through said top front opening for collecting the waste materials while they remain segregated;

tilting the container to pivot the container about said axis to direct the materials therein toward said one end; and allowing the materials in the central compartment to move out of the container rear end and to allow the materials of the side compartments to move out of the side openings when the container is tilted.

* * * * *